(No Model.)
S. B. GOFF.
WATER MOTOR.
No. 426,261. Patented Apr. 22, 1890.
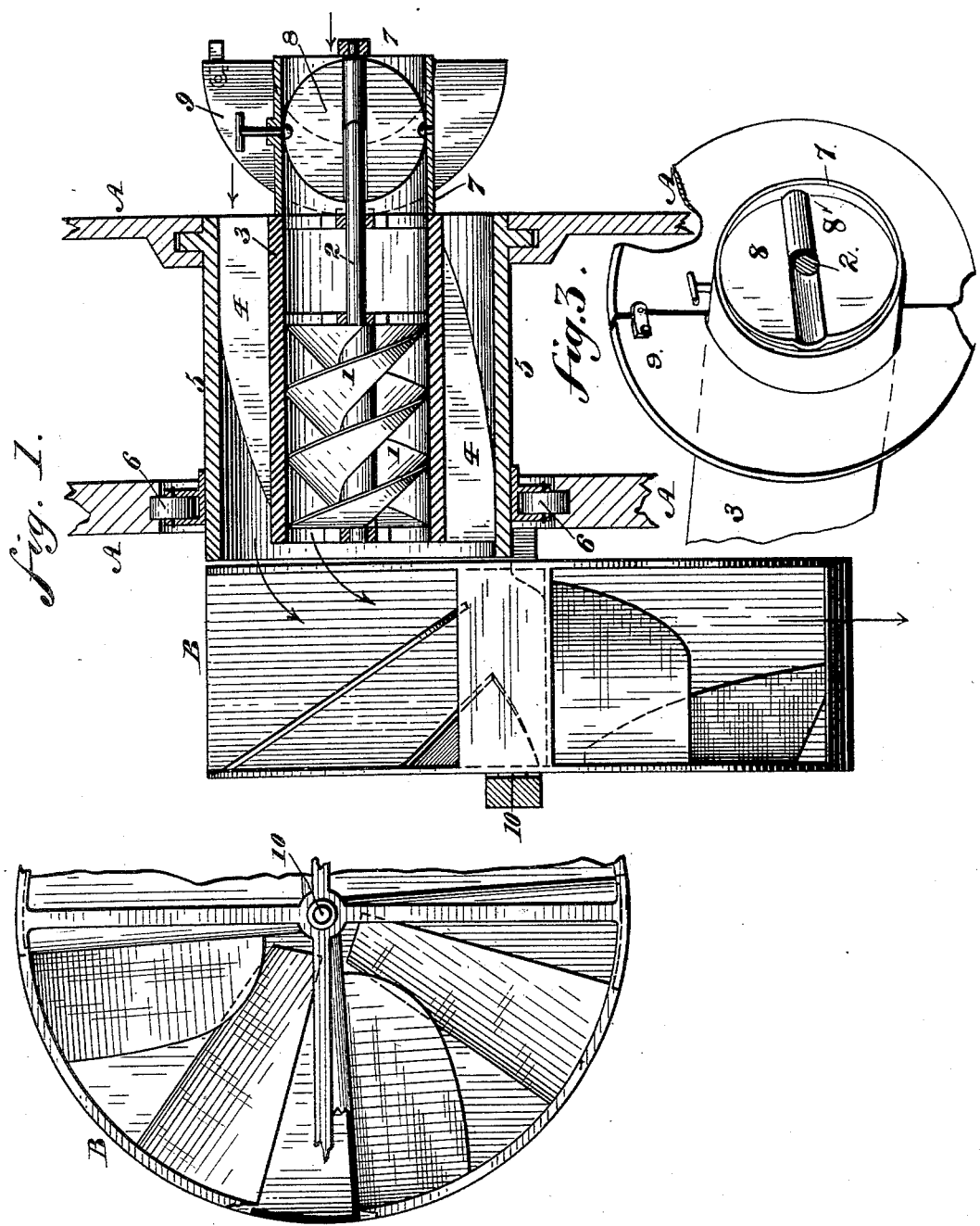
Witnesses
L. Douville,
A. P. Jennings.
Inventor
Samuel B. Goff.
By his Attorneys,
Diedersheim & Fintner

UNITED STATES PATENT OFFICE.

SAMUEL B. GOFF, OF CAMDEN, NEW JERSEY.

WATER-MOTOR.

SPECIFICATION forming part of Letters Patent No. 426,261, dated April 22, 1890.

Application filed February 23, 1889. Serial No. 300,808. (No model.)

*To all whom it may concern:*

Be it known that I, SAMUEL B. GOFF, a citizen of the United States, residing in the city and county of Camden, State of New Jersey, have invented a new and useful Improvement in Water-Motors, which improvement is fully set forth in the following specification and accompanying drawings.

My invention consists of a water-motor, which will be hereinafter fully described and definitely claimed.

Figure 1 represents a vertical section of the right-hand portion of a water-motor embodying my invention. Fig. 2 represents an end view of a portion thereof. Fig. 3 represents a detail broken perspective view of the valves used in connection with one of the wheels.

Similar letters and numerals of reference indicate corresponding parts in the several figures.

Referring to the drawings, A designates the casing of part of the motor, within which is a spiral bucket or wheel 1, whose horizontal shaft 2 is mounted on the frame of the casing, said bucket being secured to a casing 3, to whose periphery is attached spiral buckets 4, which are also attached to an exterior casing 5, which is sustained on the casing A and provided with rollers 6, so as to rotate easily thereon. Communicating with the casing 3 is a chute 7, which directs water thereinto, and is provided with an interior valve 8. The casing A is provided with an exterior valve 9, so that water may be admitted into the casing 3 or casing 5, or both, according to the shallow or deep condition of the same. The valve 8 is formed with oppositely-situated concave central depressions 8', which fit over the shaft 2 when said valve is turned in either direction. Valve 9 consists of two hinged semicircular sections fitted around the casing 3 and opening similar to a double gate.

B designates a water-wheel having a horizontal axis 10, the upper portion of said wheel being at the end of the casings 3 and 5, whereby after the water leaves the bucket 1 or bucket 4, or both, and the shaft 2 is thereby operated, it is directed against the buckets of the wheel B, thus operating the latter. It is evident that the shafts 2 and 10 receive power from the wheels and buckets connected with the same.

Having thus described my invention, what I claim as new, and desire to secure by Letters Patent, is—

1. A water-motor having a water-wheel consisting of an outer cylindrical casing with rollers thereon, an inner casing with a central shaft, spiral blades or buckets on said central shaft and the exterior portion of said inner casing, and a transversely-arranged wheel at one end of the aforesaid parts, all combined and arranged substantially as described.

2. In a water-motor, a water-wheel having an outer and an inner cylinder casing, a central shaft, spiral buckets on said shaft, spiral blades on the exterior of said inner casing, a chute leading into said inner casing, valves for the outer and inner casings, and a water-wheel transversely arranged against the said casings and operated by the outflow of water therefrom, substantially as described.

3. A water-motor having a water-wheel consisting of an outer cylindrical casing, an inner casing with a central shaft, spiral blades or buckets on said shaft and the exterior portion of said inner casing, the circular swinging valve with central oppositely-situated depressions to fit over said shaft, and a valve 9, consisting of two hinged semicircular sections, substantially as described.

SAMUEL B. GOFF.

Witnesses:
JOHN A. WIEDERSHEIM,
JAMES F. KELLY.